(12) United States Patent
Iwasaki et al.

(10) Patent No.: US 7,720,366 B2
(45) Date of Patent: May 18, 2010

(54) ACTUATOR, AND LENS UNIT AND CAMERA WITH THE SAME

(75) Inventors: Takafumi Iwasaki, Saitama (JP);
Takayoshi Noji, Saitama (JP);
Masayuki Takagi, Saitama (JP)

(73) Assignee: Tamron Co., Ltd, Saitama (JP)

( * ) Notice: Subject to any disclaimer, the term of this patent is extended or adjusted under 35 U.S.C. 154(b) by 389 days.

(21) Appl. No.: 11/797,903

(22) Filed: May 8, 2007

(65) Prior Publication Data

US 2007/0263996 A1 Nov. 15, 2007

(30) Foreign Application Priority Data

May 8, 2006 (JP) .............................. 2006-128854

(51) Int. Cl.
*G03B 17/00* (2006.01)
(52) U.S. Cl. .................................... 396/55; 348/208.99
(58) Field of Classification Search .................... 396/55
See application file for complete search history.

(56) References Cited

U.S. PATENT DOCUMENTS

| | | | | |
|---|---|---|---|---|
| 5,696,999 | A | * | 12/1997 | Matsushima et al. .......... 396/55 |
| 5,973,319 | A | * | 10/1999 | Washisu ................ 250/231.13 |
| 2005/0244152 | A1 | * | 11/2005 | Seo .............................. 396/55 |
| 2006/0017815 | A1 | * | 1/2006 | Stavely et al. ............ 348/208.7 |
| 2006/0082674 | A1 | | 4/2006 | Takayoshi |
| 2006/0133786 | A1 | * | 6/2006 | Teramoto ..................... 396/55 |

FOREIGN PATENT DOCUMENTS

| | | |
|---|---|---|
| CN | 1763622 | 4/2006 |
| EP | 1 643 756 A2 | 4/2006 |
| EP | 1 650 595 A2 | 4/2006 |
| JP | 04-034526 | 2/1992 |
| JP | 09-080537 | 3/1997 |

* cited by examiner

*Primary Examiner*—W. B. Perkey
*Assistant Examiner*—Dennis Hancock
(74) *Attorney, Agent, or Firm*—Jacobson Holman PLLC

(57) ABSTRACT

The present invention is directed to an actuator capable of retaining an image-shake correcting lens in a position(s) at which a calibration of lens optics can be affected, without additional locking means. The actuator (10) is capable of translating an image-shake correcting lens (16) so as to prevent an image from shaking, and the actuator is comprised of a fixed member (12), a movable member (14) provided with the image-shake correcting lens, supporting means (18) for supporting the movable member, a position detecting means (24, 25) for detecting a position of the movable member, a driving means (20, 22) for translating and rotating the movable member, a plurality of positioning receiving portions (15a) provided on the fixed member, a plurality of positioning contact surfaces (17a) disposed on the movable member and forced by a rotational movement of the movable member to mate and come in contact with the positioning receiving portions so that the movable member can be moved to a calibration position, and a calibrating means (37) for calibrating the position detecting means in response to detection values from the position detecting means that are received when the movable member is positioned at the calibration position.

10 Claims, 8 Drawing Sheets

FIG. 4
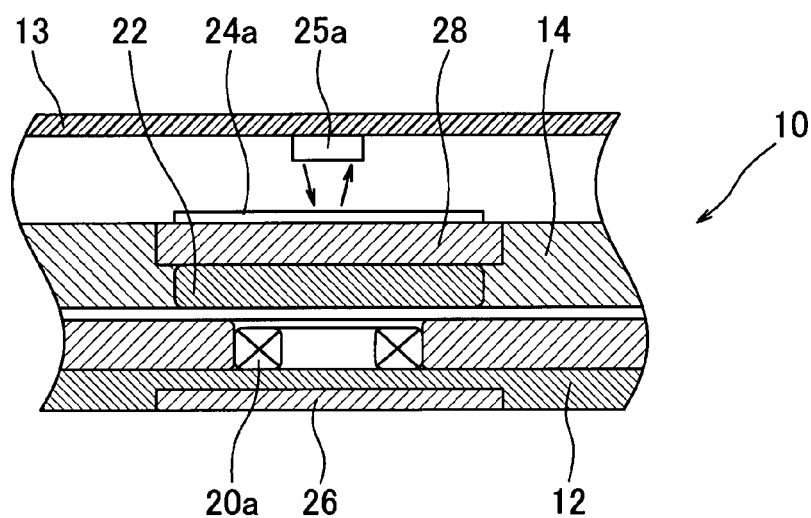
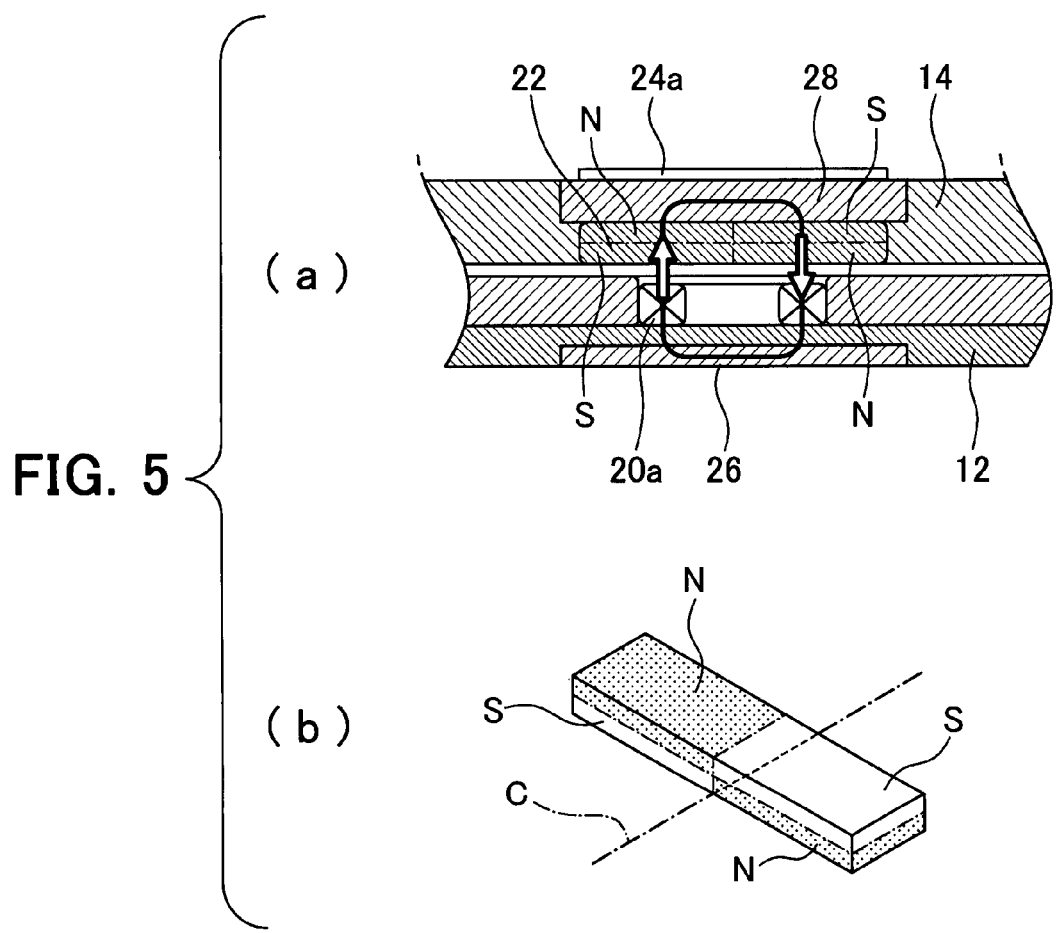
FIG. 5

ACTUATOR, AND LENS UNIT AND CAMERA WITH THE SAME

FIELD OF THE INVENTION

The present invention relates to an actuator, and a lens unit and a camera with the actuator, and more particularly, it relates to an actuator capable of translating an image-shake correcting lens of a photographing optics within a plane orthogonal to an optical axis of the lens, and a lens unit and a camera with such an actuator.

PRIOR ART

Japanese Patent No. 2754872 (Patent Document 1) discloses an invention titled as "Anti-Shaking Device". This anti-shaking device has a locking means, a movable member to be driven to suppress an image shaking, and a position detecting means. The movable member is locked by the locking means and the position detecting means is calibrated during the movable member is anchored at predetermined position.

Japanese Patent Preliminary Publication No. H09-80537 (Patent Document 2) discloses an invention titled as "Shake Correcting Device". This shake correcting device makes a shake-correcting optics translate till it comes in contact with a stopper that restricts a drive range, and a position detecting unit is calibrated in response to positions of the shake-correcting optics that are detected when it is in contact with the stopper.

Patent Document 1 Japanese Patent No. 2754872
Patent Document 2 Japanese Patent Laid-Open No. H09-80537

However, in the anti-shaking device disclosed in Japanese Patent No. 2754872, the movable member is anchored in a predetermined position in order to calibrate the position detecting means, and for that purpose, the locking means must be of some special mechanism. Hence, the anti-shaking device cannot be compact and brings about an increased manufacturing cost.

In the shake-correcting device disclosed in Japanese Patent Laid-Open No. H09-80537, the shake correcting optics must translate till it comes in contact with the drive range restricting stopper in calibrating the position detecting unit, and with such a shake correcting device incorporated in a single-lens reflex camera, for example, an image viewed in a finder tends to significantly altered during the calibrating, which gives discomfort feeling.

Accordingly, it is an object of the present invention to provide an actuator capable of retaining an image-shake correcting lens in a position(s) for operating a calibration, without additional locking means, and to provide a lens unit and a camera with such an actuator.

It is another object of the present invention to provide an actuator which does not give discomfort feeling during the calibrating operation, and to provide a lens unit and a camera with such an actuator.

SUMMARY OF THE INVENTION

In order to solve the aforementioned problems, the present invention provides an actuator capable of translating an image-shake correcting lens of photographing optics within a plane orthogonal to an optical axis of the lens so as to suppress an image shaking; the actuator comprising: a fixed member, a movable member provided with the image-shake correcting lens, supporting means for supporting the movable member and permitting the movable member to move within a plane in parallel with the fixed member, a position detecting means for detecting a position of the movable member, a driving means for translating and rotating the movable member relative to the fixed member, a plurality of positioning receiving portions provided on the fixed member, a plurality of positioning contact surfaces provided on the movable member in corresponding to the positioning receiving portions, and when the movable member is rotated, the positioning contact surfaces contacting with the positioning receiving portions, respectively, thereby the movable member to be positioned at a predetermined calibration position, and a calibrating means for calibrating the position detecting means on the basis of detected values from the position detecting means when the movable member is positioned at the calibration position.

In the present invention configured in this manner, the driving means causes the movable member supported by the supporting means to be translated relative to the fixed member, which brings about a translating movement of the image-shake correcting lens, and this prevents the resultant image from shaking. The driving means causes the movable member to be rotated relative to the fixed member, which permits the movable member to be positioned to the calibration position where the plurality of positioning receiving portions on the fixed member and the plurality of the positioning contact surfaces on the movable member are contacted with each other. The calibrating means calibrates the position detecting means on the basis of the detected values from the position detecting means when the movable member is positioned at the calibration position.

In the present invention configured in this manner, a rotational movement of the movable member caused by the driving means permits the movable member to be positioned accurately at the calibration position, and thus, there is no need of providing additional locking means to position the movable member to the calibration position.

In the present invention, preferably, the calibration position is a position where the optical axis of the image-shake correcting lens is aligned with that of the photographing optics.

In the invention configured in this manner, since the image-shake correcting lens would not cause the optical axis to partially deviate, when the image-shake correcting lens moved to the calibration position, a user does not feel discomfort during the calibrating operation.

In the present invention, preferably, the actuator further comprises a control means for outputting signals to the driving means to control a position of the image-shake correcting lens, and the control means conducts an image-shake suppressing control by translating the movable member about an operating center position a predetermined angular distance away from the calibration position.

In the present invention configured in this manner, once the movable member is moved to either of the calibration position and the operating center position, an image viewed in a finder is unaltered, and hence, a user does not feel discomfort during the calibrating operation.

In the present invention, preferably, the control means causes the movable member to be rotated with maintaining the condition where the optical axis of the image-shake correcting lens is aligned with that of the photographing optics, when the movable member is moved from the calibration position to the operating center position to start the image-shake suppressing control.

In the present invention configured in this manner, since when the movable member is moved from the calibration position to the operating center position, an image viewed in a finder is unaltered, a user does not feel discomfort during the calibrating operation is transferred to the image-shake suppressing control.

In the present invention, preferably, the positioning receiving portions and the positioning contact surfaces include first and second sets of the positioning receiving portions and the positioning contact surfaces, and a rightward rotation of the movable member permits the first set of the positioning receiving portions and the positioning contact surfaces to be contacted with each other, resulting in the movable member being positioned at a first calibration position while a leftward rotation of the movable member permits the second set of the positioning receiving portions and the positioning contact surfaces to be contacted with each other, resulting in the movable member being positioned at a second calibration position.

In the invention configured in this manner, the calibration is conducted based on two varied calibration positions, which make it possible to calibrate with enhanced accuracy.

In the present invention, preferably, the calibrating means calibrates a sensitivity of the position detecting means on the basis of detection values from the position detecting means that are produced when the movable member is in the first and second calibration positions, respectively.

In the invention configured in this manner, the sensitivity of the position detecting means can be calibrated based on two of the varied calibration positions.

In the present invention, preferably, the control means conducts the image-shake suppressing control about an intermediate position between the first and second calibration positions as the operating center position.

In the invention configured in this manner, with two varied calibration positions being ensured to be available, an image-shake correcting lens can take enlarged movable area during the image-shake suppressing control.

In the present invention, preferably, the driving means comprises at least three driving coils attached to one of the fixed member and the movable member, and driving magnet members attached to the other of the fixed member and the movable member in corresponding positions to the driving coils.

In the invention configured in this manner, by supplying the driving coils with current, a driving force is produced between the driving coils and the driving magnet members and the movable member is moved relative to the fixed member.

In the invention configured in this manner, the driving means for translating and rotating the movable member relative to the fixed member can be implemented with a simplified structure.

The present invention provides a lens unit comprising a lens barrel, photographing optics disposed within the lens barrel, a vibration detecting means for detecting vibrations of the lens barrel, and an actuator according to the present invention, said fixed member being attached to the lens barrel and said actuator moving the image-shake correcting lens in response to signals detected by the vibration detecting means so as to suppress an image shaking.

The present invention provides a camera that includes a lens unit of the present invention.

Thus, the actuator, and the lens unit and the camera with the actuator according to the present invention permit the image-shake correcting lens to be positioned in a calibration position (s) without additional locking means.

Also, the actuator, and the lens unit and the camera with the actuator permit calibration operation without giving discomfort feeling to user.

BRIEF DESCRIPTION OF THE DRAWINGS

FIG. 4 is a partial enlarged sectional view depicting a driving mechanism and a position-detecting mechanism in the actuator FIG. 5($a$) is a diagram illustrating magnetic line of force in a magnetic circuit essentially consisting of driving magnet members, back yokes, and attracting yokes while FIG. 5($b$) is a perspective view showing a magnetized state of the driving magnet members.

DETAILED DESCRIPTION OF THE BEST MODE OF THE INVENTION

Preferred embodiments of the present invention will now be described in conjunction with the accompanying drawings.

Figure 1:
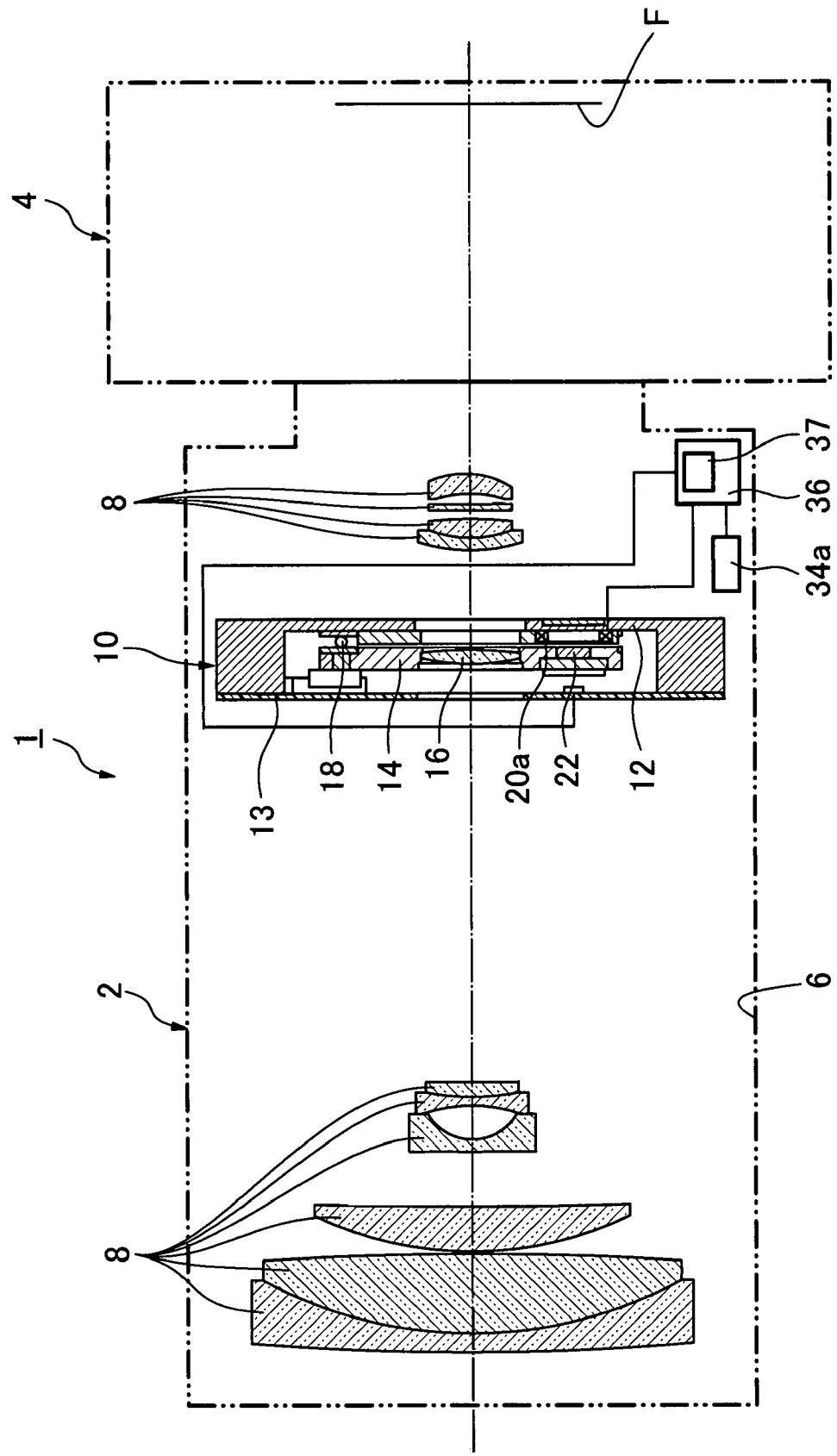
FIG. 1 is a sectional view of a first preferred embodiment of the present invention in an application of a camera.

With reference to FIGS. 1 to 9, a first preferred embodiment of a camera in accordance with the present invention will be detailed. FIG. 1 is a sectional view of the exemplary camera of the present invention.

As shown in FIG. 1, a camera 1 of the present invention is comprised of a lens unit 2 and a camera body 4. The lens unit 2 has a lens barrel 6, photographing lens pieces 8 disposed inside the lens barrel and serving as a photographing optics, an actuator 10 that moves an image-shake correcting lens 16 within a predetermined plane, and gyros 34$a$, 34$b$ serving as vibration detecting means for detecting vibrations of the lens barrel 6 (only one of the gyros, 34$a$, is shown).

The lens unit 2 is attached to the camera body 4 and focuses the incident beam onto a film plane F.

The lens barrel 6, which is roughly cylindrical in shape, has the photographing lens pieces 8 held therein, and part of the photographing lens pieces 8 are moved to effect a focusing adjustment.

The exemplary camera 1 of the present invention uses the gyros 34$a$, 34$b$ to detect vibrations, and in response to the detection results, the actuator 10 conducts a movement of the image-shake correcting lens 16 so as to stabilize the focusing and obtain an image without shake on the film plane F in the camera body 4. In this embodiment, the gyros 34$a$, 34$b$ are piezoelectric vibrator gyros. Although, in this embodiment, the image-shake correcting lens 16 is of a single lens piece, this single lens to stabilize the focusing may be replaced with a group of lens pieces. The image-shake correcting lens referred to herein comprises either a single lens piece or a group of lens pieces to stabilize the focusing.

Figure 2:
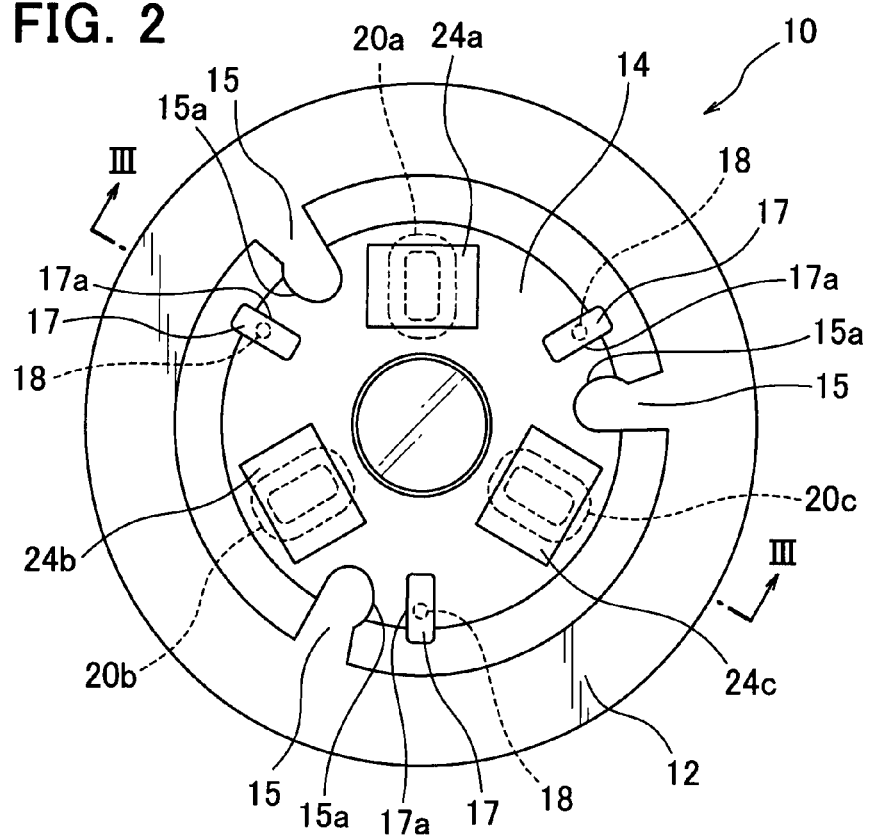
FIG. 2 is a frontal view illustrating an actuator of the camera having its sensor substrate removed.
Figure 3:
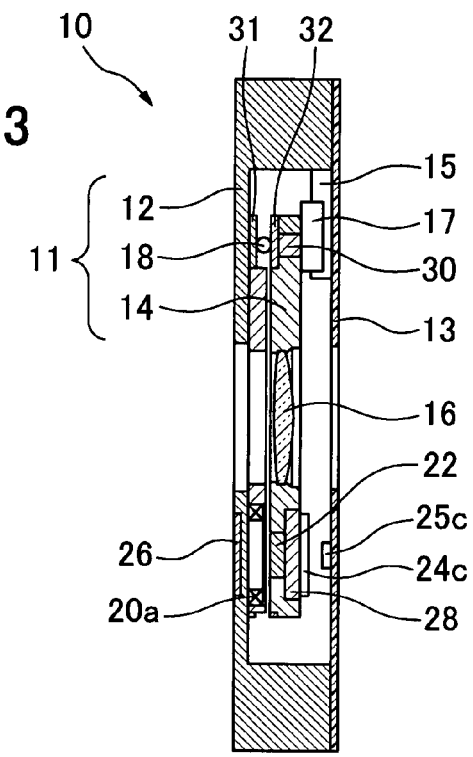
FIG. 3 is a side sectional view taken along the line III-III of FIG. 2.

With reference to FIGS. 2 to 6, configuration of the actuator 10 will now be described. FIG. 2 is a frontal view that shows the actuator 10 having its sensor substrate removed; FIG. 3 is a side sectional view taken along the line III-III of FIG. 2; and FIG. 4 is a partial enlarged cross-sectional view illustrating a driving mechanism and a position detecting mechanism of the actuator 10.

As can be seen in FIG. 2 to FIG. 4, the actuator 10 has a frame 12 serving as a static member fixed to and inside the lens barrel 6, another frame 14 serving as a movable member movable relative to the fixed frame 12, and three steel balls 18 (FIG. 3) serving as supporting means of a movable member, namely, the movable frame 14. The actuator 10 further has three driving coils 20a, 20b, 20c residing on the fixed frame 12 and three driving magnet elements 22 residing on the movable frame 14 in corresponding positions to mate with the driving coils 20a, 20b, 20c, respectively.

Furthermore, the actuator 10 has attracting yokes 26 and back yokes 28, and the attracting yokes 26 are attached to the fixed frame 12 to permit magnetic force of driving magnet members 22 to attract the movable frame 14 to the fixed frame 12 while the back yokes 28 are attached to a reverse or front side of the driving magnet members 22 to permit the magnetic force of the driving magnet members 22 to effectively direct toward the fixed frame 12. The actuator 10 additionally has attracting magnet members 30 to attach the steel balls 18 to the movable frame 14, and steel ball seats 31, 32 respectively mounted on the fixed frame 12 and the movable frame 14 so as to let the steel balls 18 smoothly roll between both the frames. The driving coils 20a, 20b, 20c and three of the driving magnet members 22 correspondingly positioned to mate with the coils cooperatively function as a driving means for translating and rotating the movable frame 14 relative to the fixed frame 12.

In addition, the actuator 10 has a sensor substrate 13 attached to the fixed frame 12 to cover the movable frame 14, three reflection patterning members 24a, 24b, 24c attached on the reverse or front side of their respective mated driving magnet members 22 on the movable frame 14, and three reflection sensors 25a, 25b, 25c attached to the sensor substrate 13 in positions opposed to three of the reflection patterning members, respectively. The reflection sensors 25a, 25b, 25c and the reflection patterning members 24a, 24b, 24c work cooperatively as a position detecting means.

Also, as shown in FIG. 1, the actuator 10 has a controller 36 serving as a control means that, in response to vibrations detected by the gyros 34a, 34b and position data on the movable frame 14 detected by the reflection sensors 25a, 25b, 25c, adjusts current to apply to the driving coils 20a, 20b, 20c, respectively. The controller 36 has a built-in calibrating means 37 to calibrate offset errors of the reflection sensors 25a, 25b, 25c.

The actuator 10 enables the movable frame 14 to move within a plane in parallel with the film plane F relative to the fixed frame 12 secured to the lens barrel 6, and this results in the image-shake correcting lens 16 attached to the movable frame 14 being moved so as to focus an image on the film plane F without a disturbance despite vibrations of the lens barrel 6.

The fixed frame 12 is a roughly doughnut-shaped disk, having a rim in its outer periphery, and three of the driving coils 20a, 20b, 20c are disposed thereon. As will be recognized in FIG. 2, the three driving coils 20a, 20b, 20c have their respective centers on a single circle of which center is coincident with a point of the optical axis of the lens unit 2. In this embodiment, the driving coil 20a is located upwardly from the optical axis while the remaining driving coils 20b, 20c are respectively separated by a central angle of 120 degrees from the driving coil 20a. More specifically, the driving coils 20a, 20b, 20c are equidistance from the optical axis and equiangular from one another. The driving coils 20a, 20b, 20c have their respective wirings wound in a rounded rectangular shape of which center line is partially coincident with a radius of the circle about the optical axis.

The movable frame 14 is a roughly doughnut-like shaped circular plate inside the fixed frame 12, being surrounded by the rim of the fixed frame 12. The image-shake correcting lens 16 is fitted in a center hole of the movable frame 14. The driving magnet members 22, which are respectively shaped in a rectangular, are embedded in the movable frame 14 along its circular extension in corresponding positions to face the driving coils 20a, 20b, 20c, respectively. Position "to face the driving coil" referred to herein is positional range in which a magnetic field brought by the driving coil substantially takes effects. On the reverse side of the driving magnet members 22, namely, on the side opposite to that has the driving coils disposed, the rectangular back yokes 28 reside so that a magnetic flux from the driving magnet members 22 is effectively directed toward the fixed frame 12.

On the reverse or rear side of the driving coils on the fixed frame 12, namely, on the side opposite to the movable frame 14, the attracting yokes 26, which are respectively shaped in a rectangular, are attached. The magnetic force, which the driving magnet members 22 exert on the attracting yokes 26 in corresponding positions to face them, causes the movable frame 14 to be attracted to the fixed frame 12. In this embodiment, the fixed frame 12 is made of non-magnetic material so that magnetic line of force of the driving magnet members 22 can effectively reach the attracting yokes 26.

The magnetic force exerted by the driving magnet members 22 will now be described with reference to FIG. 5. FIG. 5(a) is a diagram showing the magnetic line of force in magnetic circuits essentially consisting of the driving magnet members 22, the back yokes 28, and the attracting yokes 26, respectively, while FIG. 5(b) is a perspective view showing a magnetized state of the driving magnet members 22. The driving magnet members 22, the back yokes 28, and the attracting yokes 26 are respectively shaped in a rectangle and have their respective longer sides aligned with one another and their respective shorter sides also aligned with one another. The driving coil 20a wound in a rectangular shape has its longer sides laid in parallel with those of the faced rectangular back yoke 28 and its shorter sides also laid in parallel with the shorter sides of the same. The driving magnet members 22 are oriented so that magnetization border C, namely, the boundary between adjacent magnetic poles is coincident with a radius of the circle on which the driving magnet members 22 are disposed. In this way, the magnetic line of force is circulated as denoted by arrows in FIG. 5(a), and driving force tangential to the circle is exerted on the driving magnet members 22 as their respective faced driving coils are supplied with current. As with the remaining driving coils 20b, 20c, disposed in the similar cooperative positions are the remaining twos of the driving magnet members 22, the back yokes 28, and the attracting yokes 26.

The "magnetization boarder C" referred to herein is the boundary between the adjacent magnetic poles when the opposite ends of any of the driving magnet members 22 are magnetized and polarized in S-pole and N-pole. Thus, in this embodiment, the magnetization border C is determined as passing through midpoints of all the longer sides of the rectangular driving magnet members 22. Also, as shown in FIG.

5(*b*), each of the driving magnet members 22 has its polarity varied as it goes in a thickness wise direction from one major surface to the other, and FIG. 5(*b*) depicts the lower left of the driving magnet member assuming S-polarity, the lower right N-polarity, the upper left N-polarity, and the upper right S-polarity, respectively.

Figure 6:
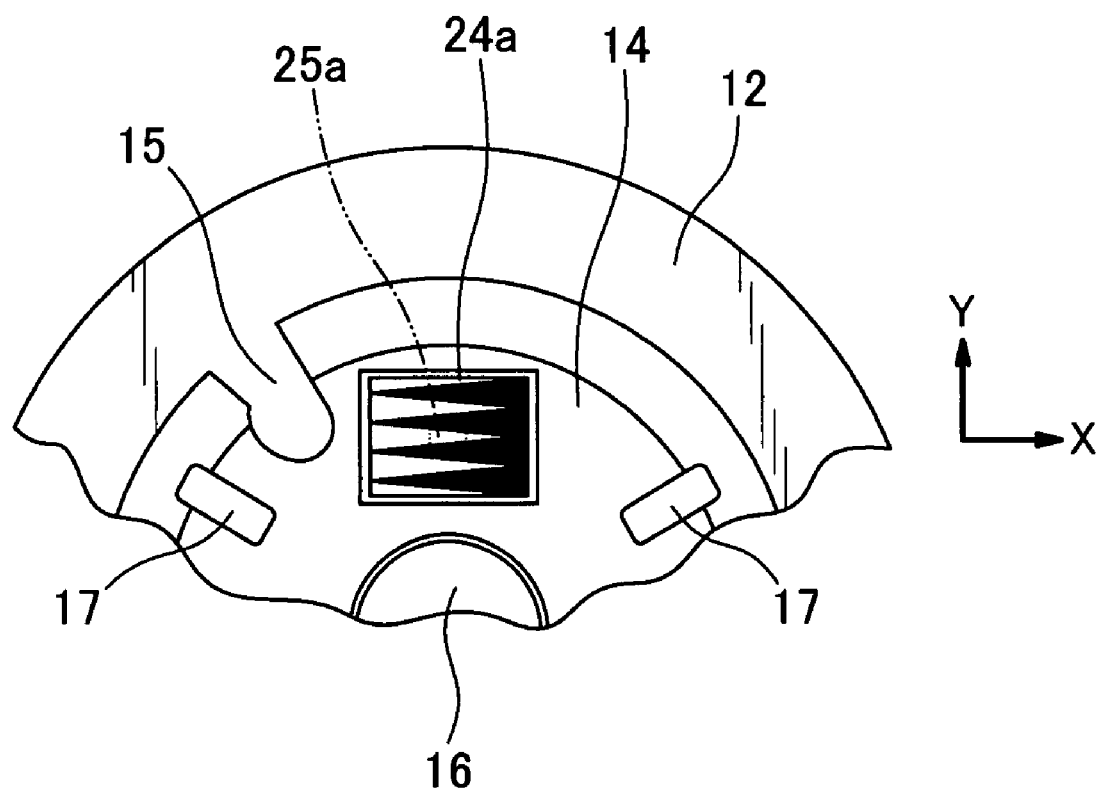
FIG. 6 is a diagram illustrating a reflection pattern and reflection sensors used to detect a position of a movable frame.

The detection of a position of the movable frame 14 will now be described with reference to FIG. 6. FIG. 6 is a diagram illustrating the reflection patterning member 24*a* and the reflection sensor 25*a* detecting a position of the movable frame 14.

As shown in FIG. 6, the reflection patterning member 24*a* is rectangular in shape and is oriented so that line passing through midpoints of its longer sides is partially coincident with the magnetization border C of the faced driving magnet member 22. The reflection patterning member 24*a* has a drawing of saw-teeth pattern where a reflective section denoted by the color white would reflect light while the remaining non-reflective section denoted by the color black would not reflect light. On the other hand, the reflection sensor 25*a* emits light and irradiates the reflection patterning member 24*a*, and receives light reflected from the reflection patterning member 24*a*. The reflection sensor 25*a* produces an output signal in response to a luminance of the received light to transfer it to the controller 36.

When the reflection patterning member 24*a* is moved leftward relative to the reflection sensor 25*a* in FIG. 6, most of the light emitted by the reflection sensor 25*a* is directed to the non-reflective section of the reflection patterning member 24*a*, and the reduced luminance of light is reflected from the reflection patterning member 24*a*. To the contrary, when the reflection patterning member 24*a* is shifted rightward, the irradiated light incident upon the reflective section of the reflection patterning member 24*a* is increased in hit ratio, resulting in the greater luminance of light being reflected from the reflection patterning member 24*a*. In this way, depending upon the increased or decreased luminance of light received by the reflection sensor 25*a*, a current position of the reflection patterning member 24*a* can be detected relative to the reflection sensor 25*a*.

In contrast, when the reflection patterning member 24*a* is shifted upward and downward relative to the reflection sensor 25*a* in FIG. 6, the incident light from the reflection sensor 25*a* is not varied in hit ratio from the reflective section to the non-reflection section, resulting in the luminance of the light reflected from the reflection patterning member 24*a* being unchanged. Thus, the reflection sensor 25*a* detects a movement of the reflection patterning member 24*a* along the X-axis or horizontal axis in X-Y dimensions but not the movement along the Y-axis or vertical axis.

As for the remaining reflection patterning members 24*b*, 24*c* (FIG. 2) and the remaining reflection sensors 25*b*, 25*c* (not shown), they are similarly disposed and combined. In this way, the reflection sensors 25*b*, 25*c* respectively detect the movement of the reflection patterning members 24*b*, 24*c* along extensions of their respective longer sides but not the movement along extensions of the shorter sides (along the radii of the movable frame 14). Depending upon detection signals produced from the reflection sensors 25*a*, 25*b*, 25*c*, translating and rotating movement of the movable frame 14 can be detected.

In addition, as can be seen in FIG. 2, the fixed frame 12 is provided with three positioning arms 15 that extend in radial directions from the rim. The positioning arms 15 are located 120-degree equiangular from one another in conformity with the circular of the fixed frame 12. The movable frame 14 is provided with three positioning projections 17 to come in contact with the positioning arms 15 on the one-to-one basis, which are also equiangular from one another in conformity with the circle of the movable frame 14. The positioning projections 17 are adapted to come in contact and mated with positioning receiving portions 15*a*. As in FIG. 2, the positioning receiving portions 15*a* are curved to respectively have a roughly arc-shaped surface. Meanwhile the positioning projections 17 have their respective positioning contact surfaces 17*a* shaped in planar to be in contact and mated with the positioning arms 15.

Configured in this way, the positioning contact surfaces 17*a* and the positioning receiving portions 15*a* are mated at contact areas on straight lines orthogonal to a sheet spread before the reader's face and including FIG. 2. Three of the pairs of the positioning contact surfaces 17*a* and the positioning receiving portions 15*a* are all mated concurrently as the movable frame 14 is rotated with the image-shake correcting lens 16 and the photographing lens 8 being optically coaxial with each other. More specifically, the movable frame 14, when moved so as to make all the three pairs the positioning contact surfaces 17*a* and the positioning receiving portions 15*a* be mated in contact with each other at a time, can mechanically be forced to a calibration position for conducting the calibration operation. The calibration position is uniquely determined where the image-shake correcting lens 16 and the photographing lens 8 have their respective optical axes coincident with each other.

Also, as can be seen in FIG. 2, three of the steel balls 18 are disposed on the outer section in the fixed frame 12 relative to the circle on which the driving coils are disposed. The three steel balls 18 are equiangular by a central angle of 120 degrees from one another, each interposed between an adjacent pair of the driving coils. As will be recognized in FIG. 3, the steel balls 18 are attracted to the movable frame 14 by virtue of the attracting magnet members 30 embedded to be in registration with the steel balls 18. Each of the steel balls 18 is attracted to the movable frame 14 by the associated attracting magnet member 30 while the movable frame 14 is attracted toward the fixed frame 12 by virtue of the driving magnet members 22, and hence, the steel balls 18 are held between the fixed frame 12 and the movable frame 14. In this way, the movable frame 14 can be retained on the plane parallel to the fixed frame 12, and as the steel balls 18 nipped from the opposite sides roll, the movable frame 14 is permitted to translate and rotate in arbitrary directions relative to the fixed frame 12.

The fixed frame 12 and the outer periphery of the movable frame 14 have their respective annular steel ball seats 31, 32. As the movable frame 14 is revolved with the steel balls 18 being held between the fixed frame 12 and the movable frame 14, the steel balls 18 accordingly roll on the steel ball seats 31, 32. This prevents the movable frame 14 from scratching the fixed frame 12 and causing friction between them when the movable frame 14 slides on the fixed frame 12. Preferably, the steel ball seat 32 have their contact surfaces smoothed and made of a material of great surface hardness so as to reduce rolling resistance between the steel balls 18 and the steel ball seat 32.

In this embodiment, the steel ball seat 32 is made of non-magnetic material so that the magnetic line of force from the attracting magnet members 30 can effectively reach the steel balls 18. Also, in this embodiment, the steel balls 18 are of spherical steel body but not limited to this shape. In other words, the steel balls 18 may assume any shape if only a part where they are in contact with the steel ball seat 32 is roughly spherical in shape. Such a shape is referred to as "spherical" herein.

Figure 7:
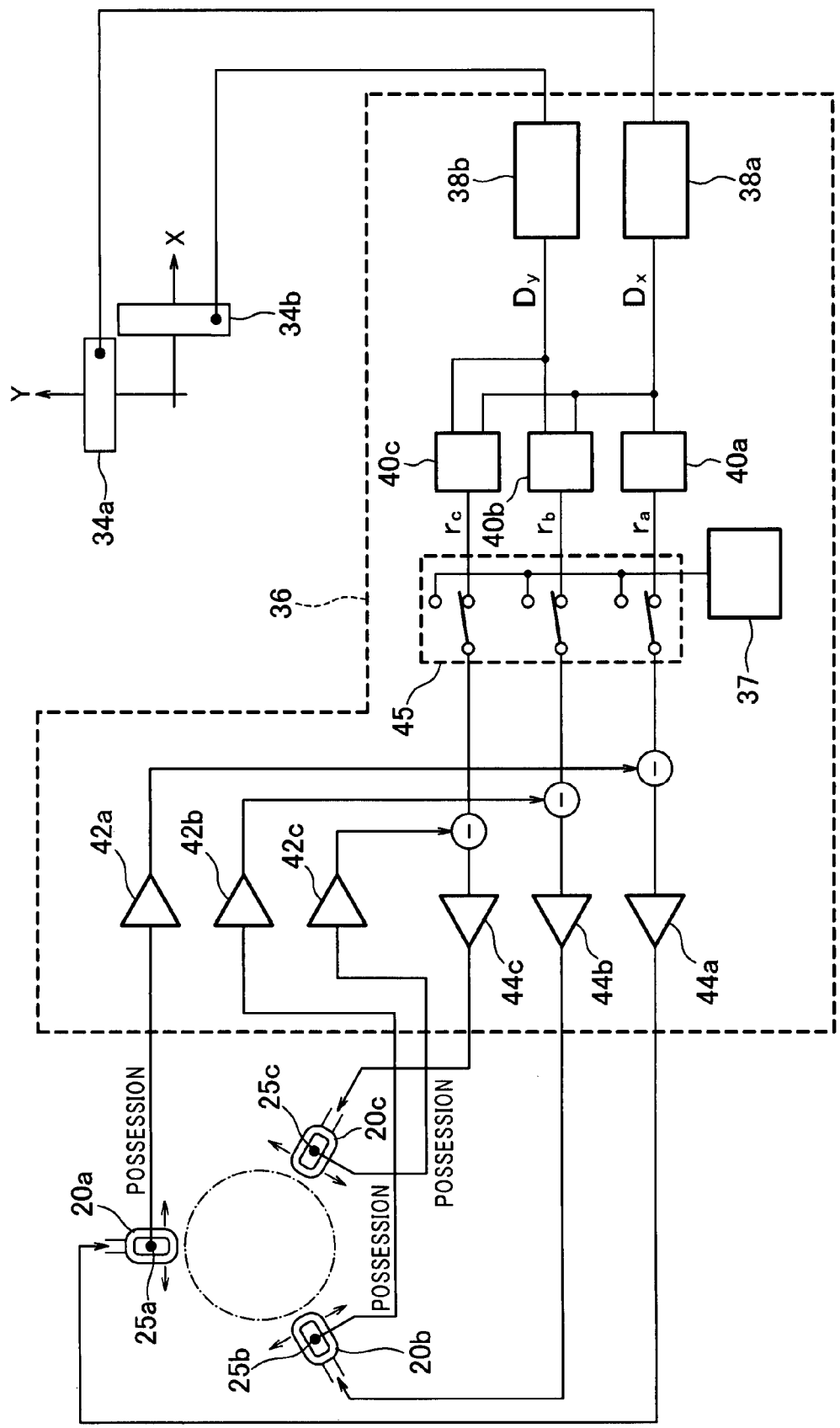
FIG. 7 is a block diagram showing a controller processing signals.

The image-shake suppressing control by the actuator 10 will now be described with reference to FIG. 7. FIG. 7 is a block diagram showing an exemplary signal processing in the controller 36. As shown in FIG. 7, two of the gyros 34a, 34b momentarily detect the lens unit 2 vibrating and produce the detection results to arithmetic operation circuits 38a, 38b that are built in the controller 36 and serve as lens position command signal generators. In this embodiment, the gyro 34a detects an angular velocity of the yawing by the lens unit 2 while the gyro 34b detects the angular velocity of the pitching by the same.

The arithmetic operation circuits 38a, 38b produce a lens position command signal in response to the angular velocity momentarily sent from the gyros 34a, 34b to give commands in time sequence on a targeted position to which the image-shake correcting lens 16 is moved. More specifically, the arithmetic operation circuit 38a integrates the angular velocity of the yawing detected by the gyro 34a over time to calibrate optical properties as desired, thereby producing horizontal components $D_x$ of the lens position command signal, and similarly, the arithmetic operation circuit 38b produces vertical components $D_y$ of the lens position command signal in response to the angular velocity of the pitching detected by the gyro 34b. Momentarily moving the image-shake correcting lens 16 as requested by the lens position command signal received as mentioned above, an image focused on the film plane F within the camera body 4 is stabilized without shaking even if the lens unit 2 is vibrated during admitting the light in the photographing.

The coil position command signal generating means built in the controller 36 is adapted to generate a coil position command signal individually for the driving coils in response to the lens position command signal produced by the arithmetic operation circuits 38a, 38b, respectively. The coil position command signal is that which represents relative positions of the driving coils 20a, 20b, 20c to their respective faced driving magnet members 22 when the image-shake correcting lens 16 is shifted as requested by the lens position command signal. Once the driving magnet members 22 respectively faced on the driving coils are shifted as requested by the coil position command signal for each driving coil, the image-shake correcting lens 16 is moved to a position as requested by the lens position command signal. In this embodiment, since the driving coil 20a is located vertically right above the optical axis, the coil position command signal $r_a$ for the driving coil 20a is identical with the horizontal components $D_x$ of the lens position command signal produced from the arithmetic operation circuit 38a. Thus, an arithmetic operation circuit 40a, which serves as a means for producing the coil position command signal to position the driving coil 20a, produces the output transferred from the arithmetic operation circuit 38a in the earlier step, as it has been without change. The coil position command signals, $r_b$ and $r_c$, which are respectively to position the driving coils 20b and 20c, are produced in response to the horizontal components $D_x$ of the lens position command signal and the vertical components $D_y$ of the same by arithmetic operation circuits 40b, 40c respectively serving as a coil position command signal generator.

An amount of the movement of the driving magnetic members 22 relative to their respective faced driving coils, which are determined by the reflection sensors 25a, 25b, 25c, respectively, is amplified at a given magnification ratio by reflection sensor amplifiers 42a, 42b, 42c, respectively. Driving circuits 44a, 44b, 44c supply their respective associated driving coils 20a, 20b, 20c with current by an amount in proportion to a differential between the coil position command signals $r_a$, $r_b$, $r_c$ and the signals output from the reflection sensor amplifiers 42a, 42b, 42c. Thus, when such a differential is not detected any longer as existing between the coil position command signals and the outputs from the reflection sensor amplifiers, or namely, once the driving magnet members reach the positions requested by the coil position command signals, no current flows in the driving coils, resulting in the driving force upon the driving magnet members turning to be naught. Switches 45 interposed between the arithmetic operation circuits 40a, 40b, 40c and their respective associated driving circuits 44a, 44b, 44c is positioned in which the arithmetic operation circuits and associated driving circuits 44a, 44b, 44c are directly connected in an image-shake suppressing control mode.

Figure 8:
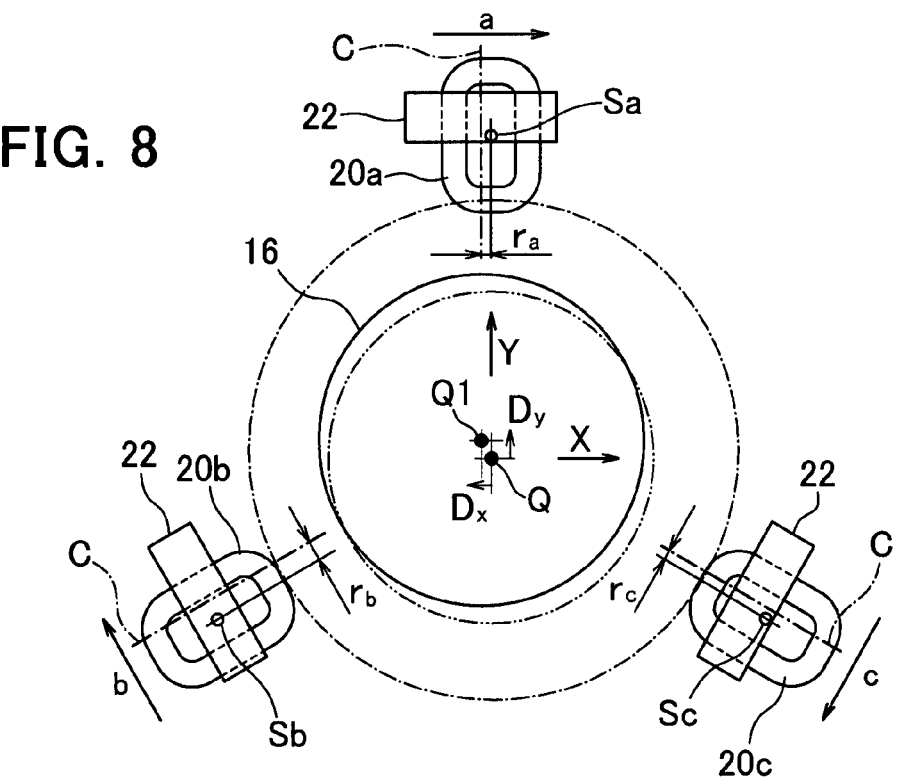
FIG. 8 is a diagram of the relative positioning among driving coil members residing on a fixed frame and three of the driving magnet members on the movable frame.

With reference to FIG. 8, a relation between the lens position command signal and the coil position command signal will now be described in terms of translating the movable frame 14. FIG. 8 is a diagram of the relative positioning among the driving coil members 20a, 20b, 20c residing on the fixed frame 12 and three of the driving magnet members 22 on the movable frame 14. The three driving coils 20a, 20b, 20c are centered respectively at points Sa, Sb, Sc on the same circle of which radius and center are designated by R and Q where the center Q of the circle is the original or zero point of coordinates on X-Y dimensions. The reflection sensors 24a, 24b, 24c share the points Sa, Sb, Sc as their respective midpoints. When the movable frame 14 is at a reference point of its capable trajectories during the image-shake correcting operation, the center of the image-shake correcting lens 16 and the optical axis of the photographing lens 8 are coincident with each other while the midpoints of the magnetization borders C in the driving magnet members 22 are also located at the points Sa, Sb, Sc, respectively, where the magnetization boarders C are directionally coincident with radii of the circle about the center Q. The movable frame 14 translates along an extension passing this reference point to execute the image-shake suppressing control.

It is now assumed that the image stabilizing lens or the image-shake correcting lens 16, which is initially at the original point Q of the coordinates on the X-Y dimensions with the horizontal axis X and the vertical axis Y, is moved by a distance $+D_y$ along the Y-axis and by a distance $-D_x$ along the X-axis. As the movable frame 14 is moved in this manner, the magnetization borders C in the driving magnet members 22 are respectively shifted toward positions as represented by hyphen-dot line as in FIG. 8. It is additionally assumed that the magnetization border C in the driving magnet member 22 faced on the driving coil 20a is deviated by $r_a$ from the point Sa, the magnetization border C in the driving magnet member 22 faced on the driving coil 20b is deviated by $r_b$ from the point Sb, and the magnetization border C in the driving magnet member 22 faced on the driving coil 20c is deviated by $r_c$ from the point Sc. The distances, $r_a$, $r_b$, $r_c$, are equivalent to those which are to be detected by the reflection sensors 25a, 25b, 25c after moving the image stabilizing lens 16 by $+D_y$ along the Y-axis and $-D_x$ along the X-axis. These distances $r_a$, $r_b$, $r_c$ are uniquely determined to the movement $D_x$ along the X-axis and the movement $D_y$ along the Y-axis. Thus, if it is required to move the image stabilizing lens 16 by $D_x$ along the X-axis and $D_y$ along the Y-axis, the uniquely determined distances $r_a$, $r_b$, $r_c$ are individually given as the coil position command signal.

With a definition that the movement in a positive direction is designated by arrows a, b, c in FIG. 8 in conformity with reference symbols for the distances $r_a$, $r_b$, $r_c$, relations of the distances $r_a$, $r_b$, and $r_c$ with the movements $D_x$ and $D_y$ are given by formulae as follows:

$$r_a = D_x$$
$$r_b = -\frac{1}{2}D_x + \frac{\sqrt{3}}{2}D_y \quad (1)$$
$$r_c = -\frac{1}{2}D_x - \frac{\sqrt{3}}{2}D_y$$

The arithmetic operation circuits 40a, 40b, 40c described in conjunction with FIG. 7 perform arithmetic operations pursuant to the above mentioned formulae (1) and respectively produce the coil position command signal.

The generation of the coil position command signal will now be described in terms of rotating the movable frame 14 instead of translating the same. In order to rotate the movable frame 14, the same value is applied as the coil position command signal for three of the coils members. More specifically, the following coil position command signal is given to rotate the movable frame 14 in the clockwise direction by an angle (in radians):

$$r_a = R\theta$$

$$r_b = R\theta$$

$$r_c = R\theta \quad (2)$$

In this way, all the driving magnet members 22 are moved by the same distance in the directions tangential to the circle on which their respective faced driving coils are located, and consequently, the movable frame 14 is rotated about the optical axis while the center of the image-shake correcting lens 16 and the optical axis of the photographing lens 8 are coincident with each other.

Referring to FIG. 1 and FIG. 8, operation of the camera 1 according to the first embodiment of the present invention will be described. Initially, pressing a booting switch (not shown) in the camera 1 to turn on an anti-shake function, the actuator 10 integrated in the lens unit 2 is activated. The gyros 34a, 34b residing in the lens unit 2 momentarily detect vibrations of a predetermined frequency band and then produce the detection results to the arithmetic operation circuits 38a, 38b built in the controller 36. The gyro 34a produces signals representing an angular velocity of the lens unit 2 in yawing directions, to the arithmetic operation circuit 38a while gyro 34b produces those in pitching directions to the arithmetic operation circuit 38b. The arithmetic operation circuit 38a integrates the received signal or the angular velocity over time to calculate a yawing angle and calibrates the integration results on predetermined optical properties to generate the lens position command signal $D_x$ designating the horizontal components. Similarly, the arithmetic operation circuit 38b integrates the received signal or the angular velocity over time to calculate a pitching angle and calibrates the integration results on the predetermined optical properties to generate the lens position command signal $D_y$ designating the vertical components. The image-shake correcting lens 16 is momentarily positioned as requested by the lens position command signals output in time sequence from the arithmetic operation circuits 38a, 38b so as to stabilize the image focused on the film plane F within the camera body 4.

The lens position command signal $D_x$ of the horizontal components output from the arithmetic operation circuit 38a is transferred to the arithmetic operation circuit 40a and then output as the coil position command signal $r_a$ to position the driving coil 20a. Additionally, the arithmetic operation circuit 40b receives both the lens position command signal $D_x$ of the horizontal components and the lens position command signal $D_y$ of the vertical components and then produces the coil position command signal $r_b$ from the second or middle equation in the formulae (1) to position the driving coil 20b. Similarly, the arithmetic operation circuit 40c receives the lens position command signals $D_x$, $D_y$ and then produces the coil position command signal $r_c$ from the third or lowest equation in the formulae (1) to position the driving coil 20c.

The reflection sensor 25a faced on the driving coil 20a produces a detection signal to the reflection sensor amplifier 42a. The detection signal amplified by the reflection sensor amplifier 42a undergoes differentiation from the coil position command signal $r_a$ (i.e., the signal used to position the driving coil 20a), and the driving coil 20a is supplied with current in proportion to the resultant difference via the driving circuit 44a. Similar to this, after the differentiation between the detection signal from the reflection sensor 25b and the coil position command signal $r_b$, the driving coil 20b is supplied with current in proportion to the resultant difference via the driving circuit 44b, and in proportion to the differentiation result between the detection signal from the reflection sensor 25c and the coil position command signal $r_c$, the driving coil 20c is supplied with current via the driving circuit 44c.

The current flowing in the driving coils causes magnetic field in proportion to it. The magnetic field excites the driving magnet members 22 disposed to face the driving coils respectively and forces them to come closer to the positions requested by the coil position command signals $r_a$, $r_b$, $r_c$, respectively, thereby displacing the movable frame 14. When the driving magnet members 22 thus excited reach the positions respectively requested by the coil position command signals, the coil position command signals and the detection signals from the reflection sensors become equivalent in signal level to each other to turn the outputs from the driving circuits to be naught, and this results in the driving magnet members completely losing the driving force to naught. Once some external disturbance, alternation in the coil position command signals, or the like causes the driving magnet members 22 to deviate from the positions requested by the coil position command signals, the driving coils are supplied with current again, and thus, the driving magnet members 22 are attracted to the requested positions.

The aforementioned operations are momentarily repeated so that the image-shake correcting lens 16 mounted on the movable frame 14 with the driving magnet members 22 is moved in compliance with the lens position command signals. In this way, the focusing is stabilized to obtain the resultant image without shake on the film plate F within the camera body 4.

Figure 9:
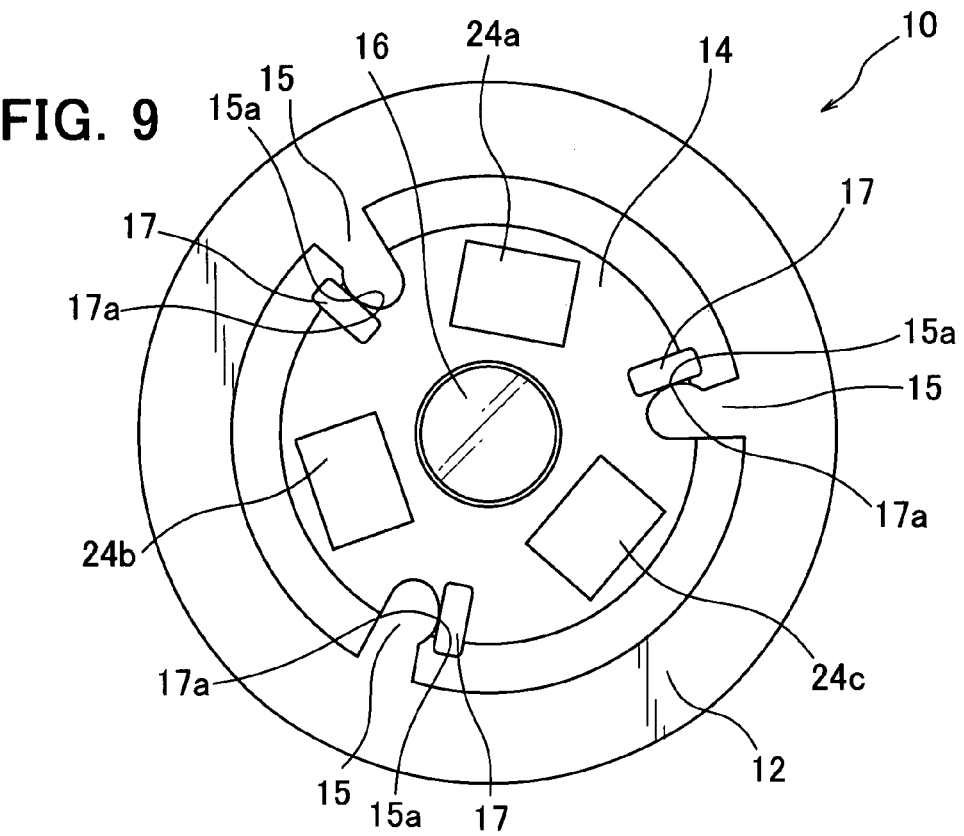
FIG. 9 is a diagram of the movable frame moved to a calibration position for a calibrating operation.

Referring to FIG. 2, FIG. 7 and FIG. 9, operation of the calibrating means 37 built in the controller 36 will now be described. FIG. 9 is a diagram of the movable frame 14 moved to a calibration position to conduct a calibrating operation. The calibrating means 37 is activated upon booting the camera 1 or under some other conditions to calibrate offset errors of the reflection sensors 25a, 25b, 25c.

When the calibrating means 37 is initially activated, the switch 45 (FIG. 7) of the controller 36 shunts to connect the calibrating means 37 with the driving circuits. Then, the calibrating means 37 produces the coil position command signals $r_a$, $r_b$, $r_c$ of naught in signal level. Given such coil position command signals $r_a$, $r_b$, $r_c$ of individually zero level, the movable frame 14 is set on the operating center position during the image-shake correcting operation as shown in FIG. 2. Then, the calibrating means 37 produces the coil position command signals $r_a$, $r_b$, $r_c$ of the same signal level. This causes the movable frame 14 to rotate in the clockwise direction while the center of the image-shake correcting lens 16 and the optical axis of the photographing lens 8 keep coincident with each other. The clockwise rotation of the movable frame 14 by a specified angle brings about a state as in FIG. 9 where the positioning receiving portions 15a of the positioning arms 15 come in contact with their respective mated positioning contact surfaces 17a of the positioning projections 17.

When there is no error in the positioning control over the movable frame 14 by the controller 36, the rotation of the movable frame 14 makes three sets of the positioning receiving portions 15a and the positioning contact surfaces 17a come in contact all at once. However, it is actually unusual that there is no error in the positioning control, one of the three sets of the positioning receiving portions 15a and the positioning contact surfaces 17a should be in contact first. The movable frame 14, which has already been forced to move, is continued to be rotated in the clockwise direction due to the still lasting driving force till it eventually reaches a targeted position where the calibration is completed with the remaining two sets of the positioning receiving portions 15a and the positioning contact surfaces 17a being in contact with each other. As has been described, such a targeted position is mechanically defined and not so influenced by secular deterioration, and hence, the positioning of the movable frame 14 can be attained with high accuracy.

After the movable frame is moved to the targeted position or the calibration position, the calibrating means 37 reads the signals output from the reflection sensors 25a, 25b, 25c, respectively. A signal level of the output signals is compared with a predetermined reference level to calibrate the offset error in the output signals from the reflections sensors. The signal level that has undergone the calibration is stored in a memory (not shown) in the controller to provide for a succeeding use in the image-shake suppressing control.

The calibrating means 37 makes the movable frame 14 revolve in the counterclockwise direction and return to the reference point of the capable trajectories. After that, the switch 45 shunts to connect the arithmetic operation circuits with their associated driving circuits to turn on the image-shake suppressing control mode.

In the camera according to the first embodiment of the present invention, the movable frame can be accurately set in a predetermined position for calibration by rotating the movable frame, and hence, no additional locking means is required for the accurate positioning for calibration.

In this embodiment, since the calibration is carried out, with the image-shake correcting lens and the photographing lens being optically coaxial with each other, there is no deviation of the optical axis caused by the image-shake correcting lens during the calibration, and a user would not feel that any effect of the calibration on his or her manipulation is disagreeable.

Further, in this embodiment, since the image-shake correcting lens and the photographing lens keep optically coaxial with each other during shifting the movable frame from the calibration position to the operating center position, an image viewed in a finder is not altered during shifting the lens position, and a user would not feel discomfort.

In the above-mentioned embodiment, instead of using the reflection pattern and the reflection sensors to detect a position of the movable frame, some other sensors may be substituted to detect the position of the movable frame. For instance, substitutional magnetic sensors such as a hall device may be provided in corresponding positions to respectively face the driving magnet members, so as to detect the positions of the driving magnet members. In this case, the calibrating means is adapted to calibrate offset errors of the magnetic sensors.

In the above-mentioned embodiment, in controlling the movable frame, the controller relies on a proportional control where after a difference between the position detected by position detecting means and the coil position command signal is obtained, a value in proportion to the difference is output as a movement by which the movable frame is to be shifted, but some other control methods may be used. For example, besides the proportional control, the controller may be configured to conduct a differentiating control, an integrating control, and the like, as well.

Furthermore, although, in the above-mentioned embodiment, three pairs of the positioning receiving portions and the positioning contact surfaces are provided, four or more pairs of them may be provided.

Moreover, although, in this embodiment, the image-shake correcting lens and the photographing lens are optically coaxial with each other to conduct the calibrating, the calibration position for the calibrating operation of the image-shake correcting lens may be some other position where the optical axes of both the lenses are out of alignment during the calibrating.

Although, in the above-mentioned embodiment, the movable frame is supported by the steel balls, such supporting means may be replaced with some other mechanism.

Also, in this embodiment, the movable frame is driven by the driving magnet members, and some other driving means may be applied to the present invention.

Figure 10:
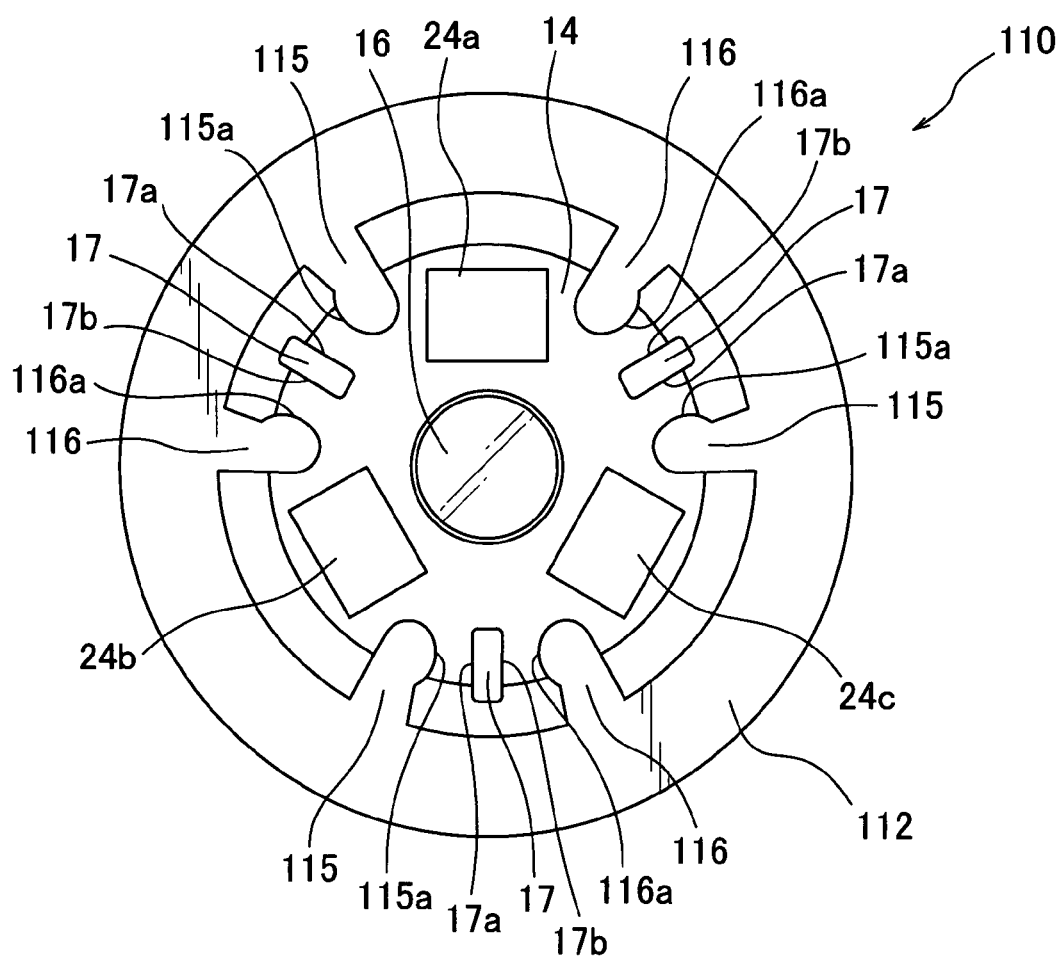
FIG. 10 is a frontal view illustrating the actuator of the camera in the second embodiment according to the present invention, with the sensor substrate being removed.
Figure 11:
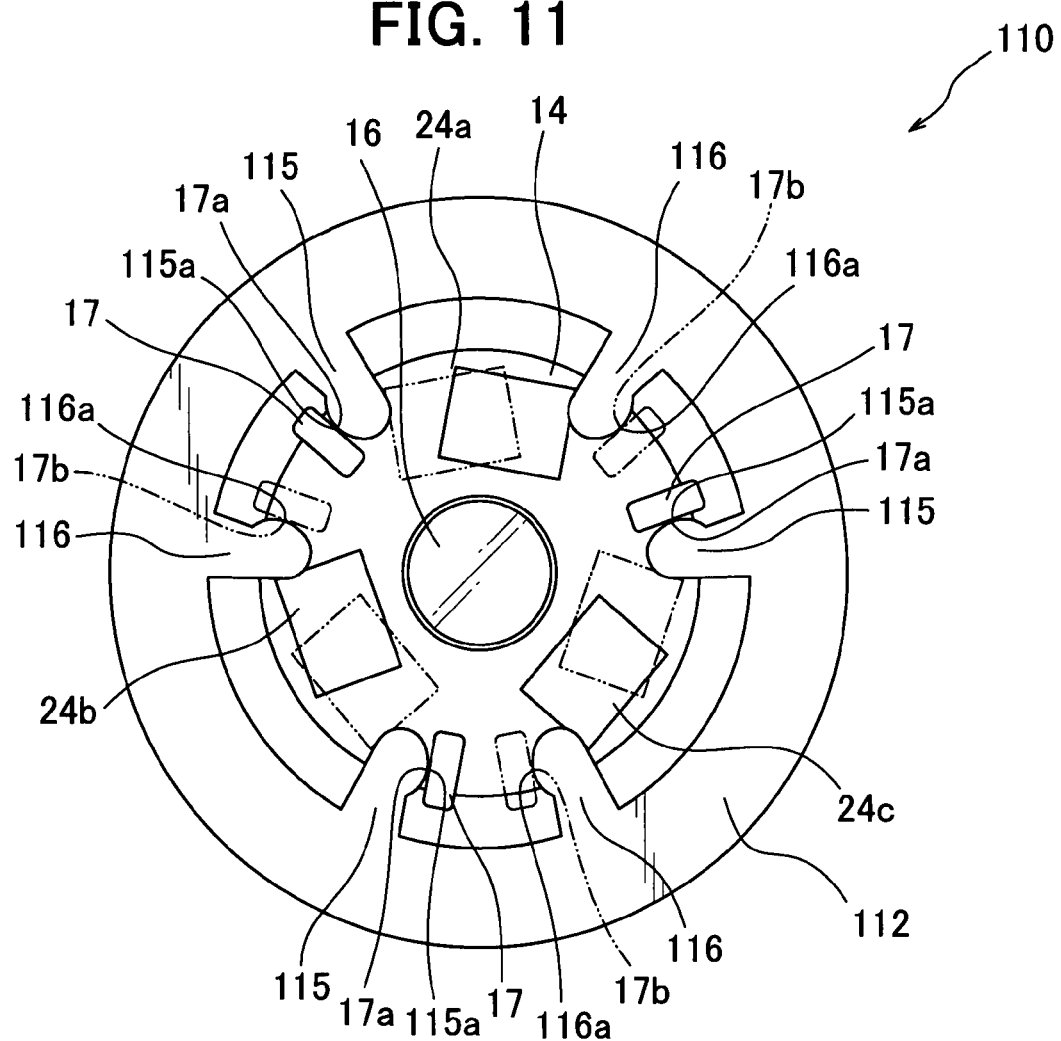
FIG. 11 is a diagram of the movable frame moved to a calibration position for a calibrating operation in the second embodiment of the present invention.

Referring to FIG. 10 and FIG. 11, a camera according to the second preferred embodiment of the present invention will now be described. The camera in this embodiment has the positioning arms of the actuator configured differently from those in the first embodiment. Thus, described below will be parts of the second embodiment varied from the first embodiment. Like parts in both the embodiments are designated by the same reference numerals, but descriptions of them are omitted. FIG. 10 is a frontal view illustrating the actuator in the second preferred embodiment of the camera according to the present invention, with the sensor substrate being removed. FIG. 11 is a diagram of the movable frame moved to a calibration position for a calibrating operation in the second embodiment of the present invention.

As shown in FIG. 10, the actuator 110 used in the second embodiment of camera has a fixed frame 112 serving as a stationary unit. The fixed frame 112 is provided with two sets of three positioning arms; i.e., a first set of three arms 115 and a second set of three arms 116. As can be seen in FIG. 10, the first set of the positioning arms 115 are separated from one another by 120 degrees along a circular extension of the fixed frame 112. Similar to this, the second set of the positioning arms 116 are equiangular from one another by 120 degrees along the circular extension of the fixed frame 112.

The positioning arms 115, 116 are provided with positioning receiving portions 115a, 116a, respectively, that are to come in contact with positioning projections 17 of a movable frame 14 or a movable member. The positioning receiving portions 115a, 116a are curved in a roughly arc-shaped surface, respectively, and an adjacent pair of the positioning receiving portions 115a and 116a are faced to each other. Three of the positioning projections 17 in the movable frame 14 are respectively interposed between the adjacent positioning receiving portions 115a and 116a. Each of the positioning projections 17 has is opposite sides shaped in planar as positioning contact surfaces 17a and 17b that are to be in contact with a pair of the adjacent positioning receiving portions 115a and 116b.

Configured in this manner, the positioning contact surfaces 17a, 17b and the positioning receiving portions 115a, 116a are mated to be in contact in areas on straight lines orthogonal to a sheet spread before the reader's face and including FIG. 10. By virtue of this configuration, the projections 17 come in contact with the first set of the positioning arms 115 as the movable frame 14 is rotated in the clockwise direction, with an image-shake correcting lens 16 and a photographing lens 8 being optically coaxial with each other, and the projections 17 come in contact with the second set of the positioning arms 116 as the movable frame 14 is rotated in the counterclockwise direction.

Specifically, rotating the movable frame 14 in the clockwise direction permits the positioning receiving portions 115a of the first set of the three positioning arms 115 to come in contact with the positioning contact surfaces 17a of the three positioning projections 17, and the movable frame 14 reaches a first calibration position uniquely determined for the calibrating. Reverse to this, rotating the movable frame 14 in the counterclockwise direction permits the positioning receiving portions 116a of the second set of the tree positioning arms 116 to come in contact with the positioning contact surfaces 17b of the three positioning projections 17, and the movable frame 14 reaches a second calibration position uniquely determined for the calibrating. As has already been stated, the image-shake correcting lens 16 and the photographing lens 8 are optically coaxial when the movable frame 14 reaches either of the first and second calibration positions for the calibrating operation.

Described below are operation of the second embodiment of the camera according to the present invention.

The operation of the second embodiment of the camera during the image-shake suppressing control operation are similar to those in the first preferred embodiment, and therefore, the descriptions are omitted. In the image-shake suppressing control, the movable frame 14 has its positioning projections 17 controlled and moved within a range denoted by phantom line in FIG. 11.

Operation of the second embodiment of the camera during the calibration of the sensors will now be described.

When a calibrating means of the camera is activated, a switch 45 (FIG. 7) of a controller 36 shunts to connect the calibrating means 37 with the driving circuits. Then, the calibrating means 37 produces coil position command signals $r_a$, $r_b$, $r_c$ of naught in signal level. This causes the movable frame 14 to reach a operating center position of the image-shake correcting operation, as shown in FIG. 10 where the center of the image-shake correcting lens 16 and the optical axis of the photographing lens 8 are coincident with each other, and a magnetization border C of driving magnet member 22 faced on a driving coil 20a is oriented to be along the vertical axis or Y-axis of coordinates on X-Y dimensions of a disk plane of the movable frame. The calibrating means 37 produces the coil position command signals $r_a$, $r_b$, $r_c$ of the same positive signal level to force the movable frame 14 to rotate in the clockwise direction from the operating center position.

In this manner, the movable frame 14 rotates in the clockwise direction, with the image-shake correcting lens 16 and the photographing lens 8 being optically coaxial with each other. Rotating the movable frame 14 by a predetermined angle in the clockwise direction permits, as shown in FIG. 11, the positioning receiving portions 115a of the positioning arms 115 to come in contact with the positioning contact surfaces 17a of the positioning projections 17, respectively.

The movable frame 14, once forced to rotate in the clockwise direction, is moved till it eventually reaches a targeted position where the calibration is completed with all the three sets of the positioning receiving portions 115a and the positioning contact surfaces 17a being in contact with each other. Such a targeted position, namely, the first calibration position, is mechanically defined and not so influenced by secular deterioration, and hence, the positioning of the movable frame 14 can be attained with high accuracy.

The calibrating means 37, after moving the moveable frame 14 to the first calibration position, reads signals output from the reflection sensors 25a, 25b, 25c and store values of the output signals in a memory (not shown) of the controller 36.

The calibrating means 37 produces the coil position command signals $r_a$, $r_b$, $r_c$ of the same negative signal level so as to rotate the movable frame 14 in the counterclockwise direction from the first calibration position. In this way, the movable frame 14 can be rotated in the counterclockwise direction, with the center of the image-shake correcting lens 16 and the optical axis of the photographing lens 8 being coincident with each other. Rotating the movable frame 14 by a predetermined angle in the counterclockwise direction permits the positioning receiving portions 116a of the positioning arms 116 to come in contact with the positioning contact surfaces 17b of the positioning projections 17, respectively, as denoted by phantom line in FIG. 11. The movable frame 14, once forced to revolve in the counterclockwise direction, is moved till it eventually reaches a targeted position where the calibration is completed with all the three sets of the positioning receiving portions 116a and the positioning contact surface 17b being in contact with each other. Such a targeted position, namely, the second calibration position, is mechanically defined and not so influenced by secular deterioration, and hence, the positioning of the movable frame 14 can be attained with high accuracy.

The calibrating means 37, after rotating the movable frame 14 to the second calibration position for the calibrating operation, reads signals output from the reflection sensors 25a, 25b, 25c, respectively. Values of the output signals are stored in a memory (not shown) in the controller 36. The values of the output signals in relation with the second calibration position for the calibrating operation is differentiated from those of the output signals stored in the memory in relation with the first calibration position. In response to the resultant differences of the output signals and a rotation angle between the first and second calibration positions stored in advance, the calibrating means 37 calibrates sensitivities of the reflection sensors 25a, 25b, 25c, namely, gain errors. In addition, the calibrating means 37 calibrates the offset error on the basis of the zero point (i.e., the operating center position during the image-shake correcting operation) defined as medians of the signal levels between the first and second calibration positions for the calibrating operation which are output from the reflection sensors 25a, 25b, 25c, respectively. Values resulted from the calibrating are stored in the memory (not shown) in the controller 36 and taken advantage of for a succeeding use in the image-shake suppressing control operation.

In the second preferred embodiment of the camera according to the present invention, since the movable frame can be settled in two varied calibration positions during the calibrating operation, the calibration can be conducted with enhanced accuracy. Further, in the embodiment of camera, errors in sensitivity, namely, gain errors of the reflections sensors can be calibrated from two varied reference positions.

Furthermore, in the second embodiment of the camera according to the present invention, medians between the first and second calibration positions are defined as a operating center position or a center of rotational strokes to conduct the image-shake correcting, and therefore, with two varied calibration positions for the calibrating being ensured to be available, an image-shake correcting lens can take enlarged movable area during the image-shake suppressing control operation.

Moreover, although, in the above-mentioned embodiment of camera according to the present invention, the image-shake correcting lens, when settled in either of the first and second calibration positions, has its optical axis coinciding with that of the photographing lens, one or both of the first and second calibration positions can be defined at a position in which the optical axis of the image-shake correcting lens does not aligned with that of the photographing lens.

Although the preferred embodiments of the present invention have been described, various modifications can be made to these embodiments. Especially, the present invention is applied to film cameras in the aforementioned embodiments, but it can be applied to any camera such as digital cameras, video cameras, and the like. Additionally, the present invention can be applied to lens units used with a camera body of these cameras.

What is claimed is:

1. An actuator capable of translating an image-shake correcting lens of photographing optics within a plane orthogonal to an optical axis of said lens so as to suppress an image shaking; said actuator comprising
    a fixed member,
    a movable member provided with said image-shake correcting lens, said movable member being translatable and rotatable relative to said fixed member,
    supporting means for supporting said movable member and permitting said movable member to move within a plane in parallel with said fixed member,
    position detecting means for detecting a position of said movable member,
    driving means for translating and rotating said movable member relative to said fixed member,
    a plurality of positioning receiving portions provided on said fixed member,
    a plurality of positioning contact surfaces provided on said movable member in corresponding to said positioning receiving portions, and when said movable member is rotated, said positioning contact surfaces contacting with said positioning receiving portions, respectively, thereby said movable member to be positioned at a predetermined calibration position, and
    calibrating means for calibrating said position detecting means on the basis of detected values from said position detecting means when said movable member is positioned at said calibration position.

2. An actuator according to claim 1, wherein said calibration position is a position where the optical axis of said image-shake correcting lens is aligned with that of said photographing optics.

3. An actuator according to claim 2, further comprising control means for outputting signals to said driving means to control a position of said image-shake correcting lens, said control means conducting an image-shake suppressing control by translating said movable member about an operating center position a predetermined angular distance away from said calibration position.

4. An actuator according to claim 3, wherein said control means causes said movable member to be rotated with maintaining the condition where said optical axis of said image-shake correcting lens is aligned with that of said photographing optics, when said movable member is moved from said calibration position to said operating center position to start the image-shake suppressing control.

5. An actuator according to claim 1, wherein said positioning receiving portions and said positioning contact surfaces include first and second sets of said positioning receiving portions and said positioning contact surfaces, and a rightward rotation of said movable member permits said first set of said positioning receiving portions and said positioning contact surfaces to be contacted with each other, resulting in said movable member being positioned at a first calibration position while a leftward rotation of said movable member permits said second set of said positioning receiving portions and said positioning contact surfaces to be contacted with each other, resulting in said movable member being positioned at a second calibration position.

6. An actuator according to claim 5, wherein said calibrating means calibrates a sensitivity of said position detecting means on the basis of detection values from said position detecting means that are produced when said movable member is in said first and second calibration positions, respectively.

7. An actuator according to claim 5, wherein said control means conducts the image-shake suppressing control about an intermediate position between said first and second calibration positions as an operating center position.

8. An actuator according to claim 1, said driving means comprising at least three driving coils attached to one of said fixed member and said movable member, and driving magnet members attached to the other of said fixed member and said movable member in corresponding positions to said driving coils.

9. A lens unit comprising:
    a lens barrel,
    photographing optics disposed within said lens barrel,
    a vibration detecting means for detecting vibrations of said lens barrel, and
    an actuator as defined in claim 1, said fixed member being attached to said lens barrel and said actuator moving said image-shake correcting lens in response to signals detected by said vibration detecting means so as to suppress an image from shaking.

10. A camera comprising a lens unit as defined in claim 9.

* * * * *